United States Patent

[11] 3,617,932

| [72] | Inventors | Thomas L. Paoli<br>Chatham;<br>Jose' E. Ripper, North Plainfield, both of N.J. |
|---|---|---|
| [21] | Appl. No. | 833,366 |
| [22] | Filed | June 16, 1969 |
| [45] | Patented | Nov. 2, 1971 |
| [73] | Assignee | Bell Telephone Laboratories, Incorporated<br>Murray Hill, N.J. |

[54] METHOD FOR PULSE-WIDTH-MODULATING SEMICONDUCTOR LASERS
8 Claims, 4 Drawing Figs.

| [52] | U.S. Cl. | 331/94.5, 317/234 |
|---|---|---|
| [51] | Int. Cl. | H01s 3/18 |
| [50] | Field of Search | 250/199, 217 SS; 331/94.5; 317/235 (27); 332/7.51; 313/108 D |

[56] References Cited
UNITED STATES PATENTS

| 3,258,596 | 6/1966 | Green | 250/199 |
|---|---|---|---|
| 3,459,942 | 8/1969 | Anderson | 250/199 |
| 3,478,280 | 11/1969 | Fenner | 332/7.51 |
| 3,483,383 | 12/1969 | Konnerth | 250/199 |

OTHER REFERENCES

Lanza, " Method for Modulating the Width of the Light Output Pulse for Injection Laser," IBM Technical Disclosure Bulletin, Vol. 7, pg. 262, Aug. 1964

*Primary Examiner*—Ronald L. Wibert
*Assistant Examiner*—Edward S. Bauer
*Attorneys*—R. J. Guenther and Arthur J. Torsiglieri ABSTRACT: The width of pulses in the output of a semiconductor laser exhibiting self-induced pulsing at a relatively constant repetition rate is modulated by applying to the laser a perturbation signal at a frequency that is related to the pulse repetition rate as the ratio of two integral numbers and amplitude modulating the signal.

PATENTED NOV 2 1971  3,617,932

INVENTORS T. L. PAOLI
J. E. RIPPER
BY

ATTORNEY

METHOD FOR PULSE-WIDTH-MODULATING SEMICONDUCTOR LASERS

BACKGROUND OF THE INVENTION

It has been observed by the inventors that continuously operating semiconductor junction lasers, at suitable values of temperature and current, exhibit a self-induced pulsing effect, that is, they produce a sequence of pulses at microwave rates. (T. L. Paoli and J. E. Ripper, "Coupled Longitudinal Mode Pulsing in Semiconductor Lasers," 22 Phys. Rev. Letters 1085, May 26, 1969.) The self-induced pulsing of semiconductor lasers is attributed to coupling among the longitudinal modes of the laser and the high dispersion of semiconductor materials. Thus theory indicates that it occurs for semiconductor lasers other than PN junction lasers and for pumping mechanisms other than current injection.

In a first concurrently filed application Ser. No. 833,522, entitled, "Method for Pulse-Position Modulating Semiconductor Lasers," the present inventors disclose a method for pulse-position-modulating semiconductor lasers exhibiting self-induced pulsing, and in a second concurrently filed application Ser. No. 833,365, entitled "Method for Narrowing the Width of the Pulses in Semiconductor Lasers Exhibiting Self-Induced Pulsing," they disclose a method for narrowing the width of the pulses in such lasers.

The present invention is directed toward a method for modulating the pulse width in the output of these lasers.

BRIEF SUMMARY OF THE INVENTION

It has been discovered, in accordance with the present invention, that the width of light pulses emitted by a semiconductor laser exhibiting self-induced pulsing can be modulated by applying to the laser a perturbation signal that is related to the pulse repetition rate as the ratio of two integral numbers, such as, for example, the pulse repetition rate itself or a harmonic thereof. The perturbation signal can be any signal that modulates either the optical field of the laser or the population inversion.

BRIEF DESCRIPTION OF THE DRAWINGS

The nature, features and advantages of the invention will be more readily understood from the following discussion taken in conjunction with the accompanying drawing in which.

DETAILED DESCRIPTION

Figure 1:
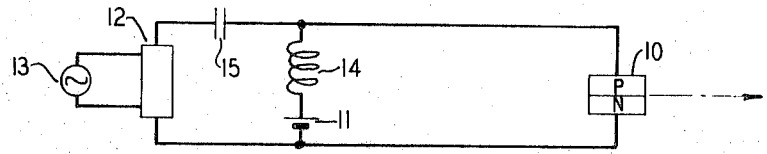
FIG. 1 is a schematic diagram of apparatus useful in modulating a PN junction laser by amplitude modulating an externally generated microwave signal.

FIG. 1 shows apparatus useful in modulating a PN junction laser in accordance with the invention, comprising a PN junction laser 10 (including a cooling arrangement not shown) coupled to both a DC voltage source 11 and a low-powered microwave voltage source 12 including a modulator 13 for amplitude modulating the microwave source according to input information. In a simple arrangement, the laser is in parallel to both the DC voltage source 11 in series with an inductor 14 and the microwave source 12 in series with a capacitor 15. The values of the inductance and capacitance of elements 14 and 15, respectively, are chosen to isolate the two voltage supplies from one another so that the total voltage drop across the laser is essentially equal to the sum of the voltages of the two sources.

The value of the DC voltage is chosen to produce self-induced pulsing in the output of laser 10. This typically depends on the particular laser and the temperature. For gallium arsenide junction lasers at liquid nitrogen temperatures, the voltage is typically that required to produce between 1.1 and 3 times the threshold current for lasing. The pulse repetition rate is typically between 0.5 and 3 gigaHertz. The exact range of DC voltages producing pulsing for a particular laser can be determined empirically by varying the voltage, detecting the laser light with a photodiode, and examining the diode output in a microwave spectrum analyzer. Once spontaneous pulsing is produced, the microwave voltage source 12 is set at a frequency approximately equal to the pulse repetition rate or a nearby harmonic thereof. At relatively small amounts of microwave power, typically less than a few milliwatts, the phase and frequency of the light pulses locks to that of the microwave source. Locking has been observed for harmonic signals, at higher power levels, up to the fifth harmonic.

By increasing or decreasing the amplitude of the microwave signal, the pulse width may be decreased or increased, respectively. For example, in a typical gallium arsenide junction laser—to be described in greater detail hereinbelow—pulsing at a repetition rate of 620 megahertz, the pulse width was reduced from about 390 picoseconds to less than 200 picoseconds by increasing the power of the microwave locking signal from 0 to 0.5 milliwatt. Higher power locking signals produce even narrower pulse widths. The speed of response is sufficiently great that information-carrying capacities of the order of hundreds of megahertz are expected.

As previously stated, this pulsing behavior of the laser is attributed to coupling among the longitudinal modes of the laser and the high dispersion of semiconductor materials. The theory indicates that similar pulsing behavior is present in semiconductor materials other than gallium arsenide and/or using pumping mechanisms other than injection through a junction. The pulse width in such lasers can be modulated by analogous modulation of the pumping source. For example, in a semiconductor laser pumped by an electron beam, a constant frequency perturbation signal can be applied to the electron beam and the depth of modulation varied in accordance with an information-carrying signal. In an optically pumped laser, the optical pumping source is similarly modulated at a constant frequency microwave rate and the depth of modulation varied.

The invention will become clearer by reference to the following specific example.

EXAMPLE 1

A gallium arsenide junction laser was fabricated in the following manner. An N-doped substrate was formed by growing a tellurium-doped crystal of gallium arsenide by the Czochralski method and slicing the crystal into wafers. The free electron concentration of the substrate was between 3 4.5×4.5 $10^{18}$ electrons per cubic centimeter. A P-doped region was diffused in the substrate using the well-known box method with a source comprising a 2.0 percent solution of zinc in gallium saturated with gallium arsenide. The diffusion time was 4 hours at 800° C. The depth of the junction thus formed was about 1.8 microns.

The substrate was then heat treated. After a protective layer of about 950 angstroms of $SiO_2$ was applied, the substrate, along with a few milligrams of pure arsenic, was placed in a quartz ampul (having a volume of about 7 centimeters). The ampul was evacuated to a pressure of $10^{17}$ millimeters of mercury. The ampul was then heated 4 hours at 850° C. and quenched to 0° C. by immersion in ice water.

After the heat-treating step, the electrical contacts to the N- and P-regions of the diode were formed. Stripes having dimensions 25.5×380 microns were cut through the oxide on the P-doped region by photolithographic methods. A second diffusion was then carried out in order to make a good ohmic contact to the P-doped region. (This diffusion does not alter the original diffusion and is used only to make good contacts.) This step was carried out by the box method, using a pure zinc arsenide source and a diffusion time of 15 minutes at 650° C. This diffusion formed a heavily doped layer in the P-region with a thickness of less than 3,000 angstroms. A metal contact comprising 500 angstroms of titanium, 5,000 angstroms of silver, and 1,000 angstroms of gold was then applied to the P-region. The N-doped side was lapped down to a thickness of about 105 microns and a contact comprising 2,000 angstroms of tin, 4,000 angstroms of nickel and 4,000 angstroms of gold was applied. The substrate was then scribed and cleaved to form individual Fabry-Perot cavities having final dimensions on the order of 100×380×625 microns.

The finished laser was then mounted on a copper heat sink in a microwave package having a window so that light from the laser could emerge. The package was inserted as the termination of a 50-ohm transmission line, designed in accordance with well-known microwave techniques to provide good coupling of external microwave signals into the laser.

Over certain ranges of injection current (between one and two times threshold) at heat sink temperatures between 77° and 110° K., the light intensity from the above laser consisted of spontaneously generated pulses at repetition rates between 500 MHz. and 1,200 MHz. For example, at a current of 670 ma. and a heat sink temperature of 96° K., pulses whose total width at the half-power point was approximately 400 psec. were generated at 620 MHz. When locked by approximately 0.5 mw. of external microwave power at the pulse frequency, the pulse width was reduced to less than 200 picoseconds (this measurement being limited by the resolution of the detection system). This laser was operated for about 200 hours over a period of 6 weeks with no noticeable change in its characteristics.

Figure 2:
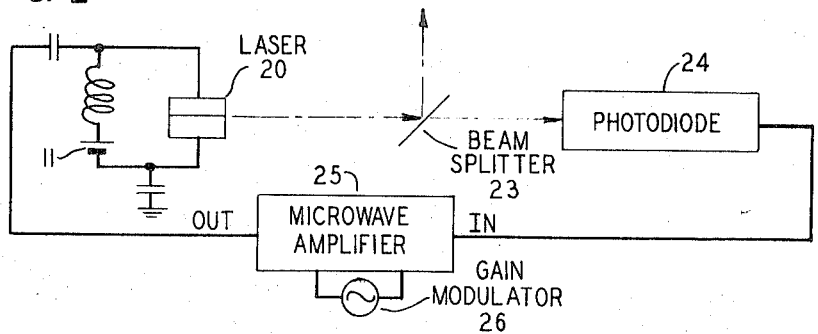
FIG. 2 is a schematic diagram of apparatus useful in modulating a semiconductor laser by modulating the gain of the output of a photodiode receiving a portion of the laser output light.

FIG. 2 is a schematic view of apparatus for pulse width modulating a semiconductor laser exhibiting self-induced pulsing comprising a semiconductor laser 20, such as a PN junction laser, and pumping means 11 such as a DC voltage source. The amplified output of a high-speed photodiode 24 such as a PIN diode is applied to modulate the pumping source. The pumping source is chosen to produce self-induced pulses in the output of laser 20. The photodiode 24 is disposed so as to receive the portion of the laser light passing through beam splitter 23. The electrical signal from diode 24 is amplified by microwave amplifier 25 and added to the voltage applied to the laser. The gain of amplifier 25 is modulated in accordance with an information-carrying signal. In operation, the laser pulse repetition rate adjusts itself until the feedback loop provides a signal in phase with the self-induced pulses. The amount of pulse narrowing depends upon the gain in the feedback loop. Thus modulation of the gain by gain modulator 26 modulates the pulse width of the laser output. The useful light output is that portion which is reflected by beam splitter 23. Similar arrangements can be used for semiconductor lasers other than PN junction lasers by using the amplified feedback signal to modulate the pumping source and varying the depth of modulation in accordance with an information-carrying signal.

Figure 3:
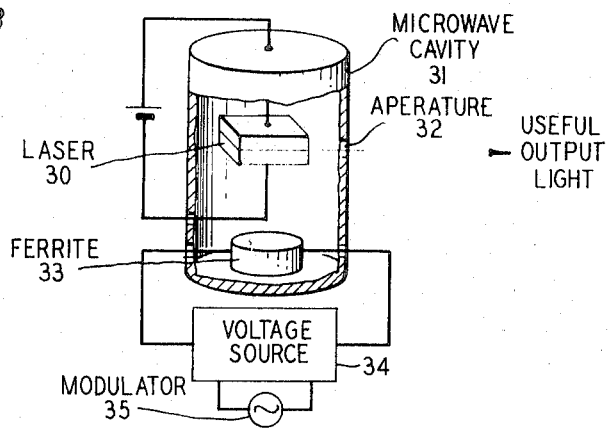
FIG. 3 is a schematic diagram of apparatus useful in modulating a PN junction laser by controlling the loss of a microwave resonant cavity enclosing the laser.

FIG. 3 is a schematic view of apparatus for pulse width modulating a junction laser by modulating the loss of a microwave resonant cavity, comprising a junction laser 30 disposed within a microwave resonant cavity 31 including a ferrite 33 and an aperture 32 through which the laser light can pass. Ferrite 33 is electrically coupled to a voltage source 34 which can be modulated according to input information from modulator 35 to change the absorption of the ferrite 33. Means are also provided for applying sufficient voltage to laser 10 to produce self-induced pulsing.

The dimensions of microwave cavity 31 are chosen to provide resonance at a frequency approximately equal to the pulse repetition rate of the laser. The small modulation of the injection current, which takes place when the laser pulse, results in the buildup of a standing wave in the resonator which, in turn, narrows the pulses. Modulation of the absorption of ferrite 33, however, can control the loss of the cavity and thus control the width of the pulses. Therefore modulation of the bias voltage across the ferrite produces pulse width modulation of laser output signal.

Figure 4:
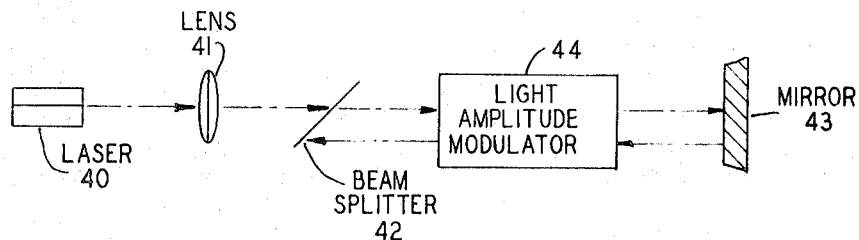
FIG. 4 is a schematic diagram of apparatus useful in modulating a semiconductor laser by amplitude modulating an optical feedback signal.
Figure 4:

FIG. 4 is a schematic diagram of apparatus useful in modulating a laser by amplitude modulating an optical feedback signal. The figure shows a semiconductor laser 40 and an arrangement for coupling back into the laser a portion of its output light comprising a collimating lens 41, a beam splitter 42 and a mirror 43, all disposed to receive light from the laser. An optical amplitude modulator 44, such as a Kerr cell, is also disposed in the feedback path to control the amount of feedback. After being reflected from mirror 43, the portion of light passing through the feedback arrangement is focused back into the active region of the laser. When the laser is properly pumped to produce self-induced pulsing at a relatively constant frequency, narrowing of the pulses is achieved when $NF = MC/L$ where $N$ and $M$ are integers, is the speed of light and $L$ is the optical path length between the laser and the mirror. As may be seen from the above formula, the frequency of the perturbation signal is related to the pulse repetition rate by the ratio of two integral numbers. One of the advantages of this technique for pulse width modulation is that it can be used with semiconductor lasers that are pumped by means other than current injection.

What is claimed is:

1. A method for modulating a semiconductor laser comprising the steps of:
   inducing spontaneous pulsing in the laser by the application of suitable pumping power;
   applying to said laser a low-power perturbation signal having a frequency related to the pulse repetition rate of the spontaneous pulsing as the ratio of two integral numbers;
   and modulating the amplitude of said signal in response to input information to modulate the width of the pulses.

2. The method according to claim 1 wherein:
   said semiconductor laser is a PN junction laser;
   said spontaneous pulsing is induced by the application of a DC voltage; and
   said low-power perturbation signal is applied by a microwave frequency voltage source.

3. The method according to claim 2 wherein said semiconductor laser is a gallium arsenide junction laser.

4. Apparatus for producing a pulse width modulated light signal comprising:
   a semiconductor laser;
   means for producing self-induced pulsing at a relatively constant repetition rate in said laser;
   means for applying to said laser a perturbation signal having a frequency related to said repetition rate as the ratio of two integral numbers; and
   means for amplitude modulating said signal according to an information input signal.

5. Apparatus according to claim 4 wherein said means for applying a perturbation signal to said laser comprises means for adding a low-power microwave signal to the pumping source of said laser, said signal having a frequency approximately equal to the repetition rate of spontaneous pulsing or a nearby harmonic thereof.

6. Apparatus according to claim 5 wherein:
   said means for adding a low-power microwave signal to the pumping source of said laser comprises a photodiode for receiving optical output from said laser and an amplifier coupled to the output of said photodiode for amplifying the photodiode signal and adding it to the pumping source; and
   said means for modulating the amplitude of said signal comprises means for modulating the gain of said amplifier.

7. Apparatus according to claim 5 wherein:
   the semiconductor laser is a PN junction laser;
   said means for applying a low-power microwave signal to said laser comprises an external microwave resonant cavity surrounding said laser; and said means for modulating the amplitude of said signal comprises means for modulating the loss of said cavity.

8. Apparatus according to claim 4 wherein said means for applying to said laser a perturbation signal comprises optical feedback means for applying a portion of the optical output to the active region of the laser.

* * * * *